United States Patent
Harrington et al.

(10) Patent No.: US 10,753,893 B2
(45) Date of Patent: Aug. 25, 2020

(54) GEAR SET HEALTH MONITORING SYSTEM

(71) Applicant: Hamilton Sundstrand Corporation, Charlotte, NC (US)

(72) Inventors: Erik Harrington, Machesney Park, IL (US); Bahram Z. Movahed, Rockton, IL (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 282 days.

(21) Appl. No.: 15/881,041

(22) Filed: Jan. 26, 2018

(65) Prior Publication Data

US 2019/0234892 A1    Aug. 1, 2019

(51) Int. Cl.
| | |
|---|---|
| *G01N 25/00* | (2006.01) |
| *G01K 3/00* | (2006.01) |
| *B64D 45/00* | (2006.01) |
| *G01K 7/02* | (2006.01) |

(Continued)

(52) U.S. Cl.
CPC ........... *G01N 25/00* (2013.01); *B64D 45/00* (2013.01); *F16H 57/01* (2013.01); *G01K 3/005* (2013.01); *G01K 7/02* (2013.01); *B64C 13/34* (2013.01); *B64D 2045/0085* (2013.01); *F16H 2057/012* (2013.01); *F16H 2057/016* (2013.01)

(58) Field of Classification Search
CPC ... F16C 17/243; F16C 2361/61; G01D 21/00; G01M 13/02; G01M 13/021; G01M 15/14; F03D 17/00; F03D 15/00; F03D 15/10; F05B 2260/80; F05B 2260/4031; G01N 25/00; G01N 2291/2696; G01N 2291/02881; B64C 13/34; F16H 2057/012; F16H 2057/016; F16H 57/01; F16H 57/04
USPC ... 374/120, 121, 179, 163, 141, 1, 129, 152, 374/45, 57
See application file for complete search history.

(56) References Cited

U.S. PATENT DOCUMENTS

| | | | | |
|---|---|---|---|---|
| 3,011,937 A | * | 12/1961 | Long | B21D 13/04 425/369 |
| 3,699,806 A | * | 10/1972 | Weichbrodt | G01H 1/003 73/593 |

(Continued)

FOREIGN PATENT DOCUMENTS

| | | | |
|---|---|---|---|
| CN | 201707752 U | * | 1/2011 |
| CN | 203024442 U | * | 6/2013 |

(Continued)

OTHER PUBLICATIONS

European Search Report for Application No. 19153960.0 dated Jul. 19, 2019, 9 pages.

*Primary Examiner* — Gail Kaplan Verbitsky
(74) *Attorney, Agent, or Firm* — Cantor Colburn LLP

(57) ABSTRACT

A health monitoring system provided with an aircraft includes a temperature sensor assembly and a control system. The temperature sensor assembly is disposed within a housing and is positioned to monitor at least one of a temperature and a temperature rise of a gear of an actuator that is positioned within the housing. The control system is in communication with the temperature sensor. The control system is configured to output for display an indicator responsive to at least one of the temperature and the temperature rise of the gear being greater than a threshold.

13 Claims, 2 Drawing Sheets

(51) Int. Cl.
*F16H 57/01* (2012.01)
*B64C 13/34* (2006.01)

(56) References Cited

U.S. PATENT DOCUMENTS

| | | | |
|---|---|---|---|
| 6,225,892 B1 * | 5/2001 | Chene | F16H 57/01 |
| | | | 340/438 |
| 6,721,640 B2 * | 4/2004 | Glenn | G07C 5/0891 |
| | | | 340/945 |
| 8,515,711 B2 * | 8/2013 | Mitchell | F01D 21/003 |
| | | | 702/183 |
| 8,676,436 B2 * | 3/2014 | Raimarckers | F02C 7/06 |
| | | | 701/29.5 |
| 8,843,348 B2 * | 9/2014 | Pascu | G01M 13/028 |
| | | | 701/100 |
| 9,732,838 B2 | 8/2017 | McKimpson et al. | |
| 9,926,086 B2 * | 3/2018 | Kumar | B64F 5/60 |
| 2003/0080112 A1 * | 5/2003 | Van Bilsen | G01J 5/00 |
| | | | 219/497 |
| 2004/0002428 A1 * | 1/2004 | Harrison | C10M 141/12 |
| | | | 508/156 |
| 2007/0149339 A1 * | 6/2007 | Weith | F16H 57/0483 |
| | | | 475/160 |
| 2012/0025526 A1 | 2/2012 | Luo et al. | |
| 2014/0269824 A1 * | 9/2014 | Miller | G01K 3/04 |
| | | | 374/104 |
| 2014/0294036 A1 * | 10/2014 | Caruthers | G01N 25/72 |
| | | | 374/5 |
| 2016/0208911 A1 * | 7/2016 | Cross | B60K 6/105 |
| 2018/0108188 A1 * | 4/2018 | Canning | H04L 67/12 |

FOREIGN PATENT DOCUMENTS

| | | | | |
|---|---|---|---|---|
| CN | 105136322 | A * | 12/2015 | |
| CN | 105136322 | A | 12/2015 | |
| DE | 102016204736 | A1 * | 9/2017 | G01M 13/02 |
| DE | 102016204736 | A1 | 9/2017 | |
| EP | 2299159 | A2 * | 3/2011 | G01M 13/02 |
| EP | 2299159 | A2 | 3/2011 | |
| EP | 2330398 | B1 | 6/2011 | |
| JP | 61106724 | A * | 5/1986 | |
| JP | 11210986 | A * | 8/1999 | F16H 57/0456 |
| JP | 361039540 | A * | 1/2019 | |
| KR | 3619083748 | A * | 1/2019 | |

* cited by examiner

GEAR SET HEALTH MONITORING SYSTEM

BACKGROUND

Exemplary embodiments pertain to the art of prognostic health monitoring systems for gear sets.

Some machines, such as aircraft, employ drive systems that transmit or impart rotational or linear movement to a device such as a control surface. The drive systems may employ a gearbox having a gear set that may experience efficiency losses that shed energy in the form of heat. Accordingly, it is desirable to provide a prognostic health monitoring system of the gear sets to more quickly and accurately detect efficiency losses.

BRIEF DESCRIPTION

Disclosed is a drive system for an aircraft control surface. The drive system includes a gear set and a health monitoring system. The gear set is arranged to move an aircraft control surface. The health monitoring system is in communication with the gear set. The health monitoring system includes a temperature sensor and a control system. The temperature sensor is disposed on a gear of the gear set and is arranged to provide a signal indicative of at least one of a temperature and a temperature rise of the gear. The control system is arranged to receive the signal.

Also disclosed is a health monitoring system provided with an aircraft. The health monitoring system includes a temperature sensor assembly and a control system. The temperature sensor assembly is disposed within a housing and is positioned to monitor at least one of a temperature and a temperature rise of a gear of an actuator that is positioned within the housing. The control system is in communication with the temperature sensor. The control system is configured to output for display an indicator responsive to at least one of the temperature and the temperature rise of the gear being greater than a threshold.

Further disclosed is a method for monitoring health of a gear set. The method includes rotating a gear set to drive an actuator to move an aircraft control surface and receiving a signal indicative of at least one of a temperature and a temperature rise of a gear of the gear set from a temperature sensor disposed on the gear. The method further includes comparing at least one of the temperature and the temperature rise to at least one of a threshold temperature and a threshold temperature rise. Responsive to at least one of the temperature and the temperature rise being greater than at least one of the threshold temperature and the threshold temperature rise, the method outputs for display an indicator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
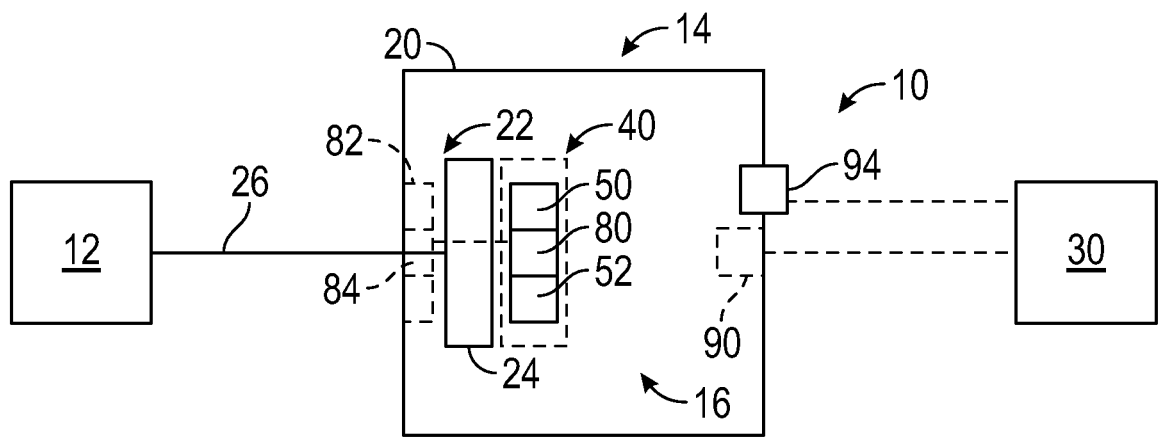
FIG. 1 is a system schematic of a flight control system employing a health monitoring system.

FIG. 1 illustrates a drive system 10 for a machine. The drive system 10 may be provided within an aircraft such that the drive system 10 is a flight control system that may control or adjust a position of a movable surface such as a slat, flap, rotor, spoiler or other control surface of an aircraft. The drive system 10 may be provided with other machines having gear driven components or control surfaces. The drive system 10 includes a movable component 12, an actuator 14, and a health monitoring system 16.

The movable component 12 may be a movable surface such as an aircraft control surface or a component connected to the aircraft control surface. The movable component 12 is drivably connected to the actuator 14. The actuator 14 may be a line replaceable unit (LRU) that is arranged to provide a rotary or linear output to drive the movable component 12 or vary a position of the movable component 12.

The actuator 14 includes a housing 20 and a gear set 22 disposed within the housing 20. The housing 20 may be a gearbox or the like that rotatably receives the gear set 22. The gear set 22 includes a gear 24 that is drivably connected to the movable component 12 through an output member 26 such as a driveshaft or drive link, which extends at least partially through the housing 20.

The health monitoring system 16 is in communication with the gear set 22 and is positioned to monitor a temperature of the gear 24 of the actuator 14. The health monitoring system 16 is arranged to directly measure or monitor a temperature of the gear 24 to aid in prognostic health monitoring of the gear set 22 to detect or monitor a temperature rise of the gear set 22 that may deviate by a predetermined amount from a normal or expected temperature rise. The temperature rise may correspond to an efficiency loss of the gear set 22. A signal indicative of the temperature or temperature rise of the gear 24 or the gear set 22 is provided to or fed back to a control system 30 that may be provided as part of the health monitoring system 16 or may be provided as part of a flight control system control unit.

The health monitoring system 16 includes a temperature sensor assembly 40. The temperature sensor assembly 40 is in wireless communication with the control system 30. The temperature sensor assembly 40 is disposed within the housing 20 and is positioned to monitor a temperature of the gear 24 of the gear set 22 and provide a signal indicative of a temperature of the gear 24 to the control system 30.

Figure 2:
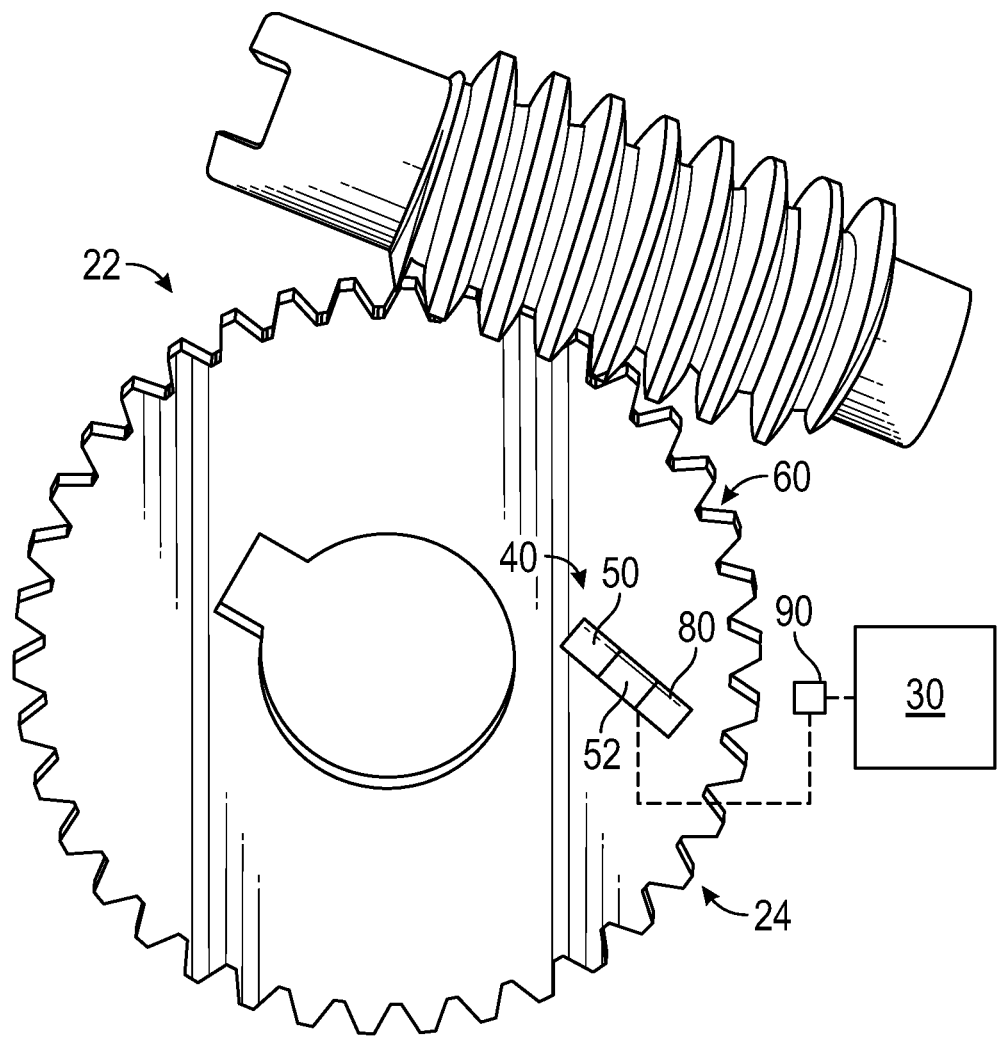
FIG. 2 is an illustrative gear set having the health monitoring system.
Figure 3:
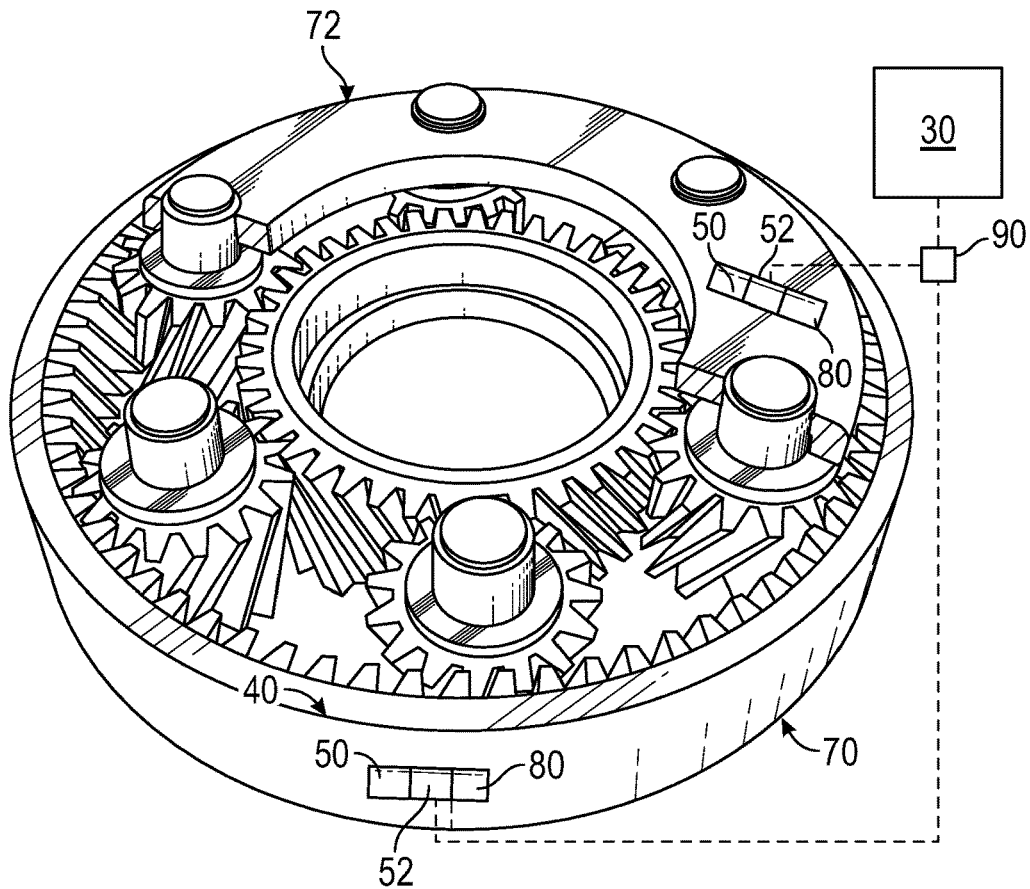
FIG. 3 is an illustrative gear set having the health monitoring system.

The temperature sensor assembly 40 includes a temperature sensor 50 and a transmitter 52. The temperature sensor 50 is arranged to directly measure or monitor a temperature of the gear 24 or the gear set 22. Referring to FIG. 2, the temperature sensor 50 may be disposed directly on a surface of the body of the gear 24. The temperature sensor 50 is spaced apart from gear teeth 60 of the gear 24. Referring to FIG. 3, the temperature sensor 50 may be disposed directly on a ring gear 70 or a planet carrier 72 should the gear set 22 be configured as a planetary gear set.

Referring to FIGS. 1-3, the temperature sensor 50 may be a thermocouple having the transmitter 52 or may be a thermocouple that is in communication with the transmitter 52. The transmitter 52 may provide signal processing and wireless communication between the temperature sensor 50 of the temperature sensor assembly 40 and the control system 30. The transmitter 52 and/or the temperature sensor 50 may be powered by a power source 80.

The power source 80 may be mounted directly to the gear 24, as shown in solid lines in FIG. 1. In other embodiments, the power source 80 may be mounted to the housing 20 and may be disposed about the output member 26, as shown in dashed lines in FIG. 1. The power source 80 may be a permanent magnet generator that includes a permanent magnet stator 82 and/or a permanent magnet rotor 84. The permanent magnet stator 82 may be disposed on the housing 20. The permanent magnet rotor 84 may be disposed on the output member 26 and rotatably disposed within the permanent magnet stator 82. The power source 80 may be a permanent magnet generator powered diode or may power a diode package that is disposed on the gear 24 that powers the temperature sensor 50 and/or the transmitter 52.

The transmitter 52 may wirelessly transmit the signal indicative of a temperature of the gear 24 to a receiver 90 that is provided with or associated with the control system 30. The receiver 90 may be disposed within the housing 20, disposed on the housing 20, or disposed outside the housing 20.

In at least one embodiment, the temperature sensor 50 may be a thermal camera 94 that is mounted to the housing 20 and faces towards the gear 24 of the gear set 22. The thermal camera 94 may be used in conjunction with the thermocouple that is disposed on the gear 24 to improve the accuracy of the temperature measurement of the gear 24. The thermal camera 94 extends through the housing 20 and faces towards the thermocouple. The thermal camera 94 may be disposed opposite the output member 26.

As stated previously, the control system 30 may be provided with the health monitoring system 16 or may be provided as part of the flight control system control unit. The control system 30 is in communication with the temperature sensor assembly 40 and is arranged to receive the signal indicative of the temperature of the gear 24. The control system 30 is arranged to output for display an indicator, responsive to the signal indicating the temperature of the gear 24 being greater than a threshold temperature or the temperature rise of the gear 24 being greater than a threshold temperature rise.

The control system 30 may be provided with the receiver 90 that is in communication with the transmitter 52. The receiver 90 may be powered by the power source 80 or may be separately powered.

Figure 4:
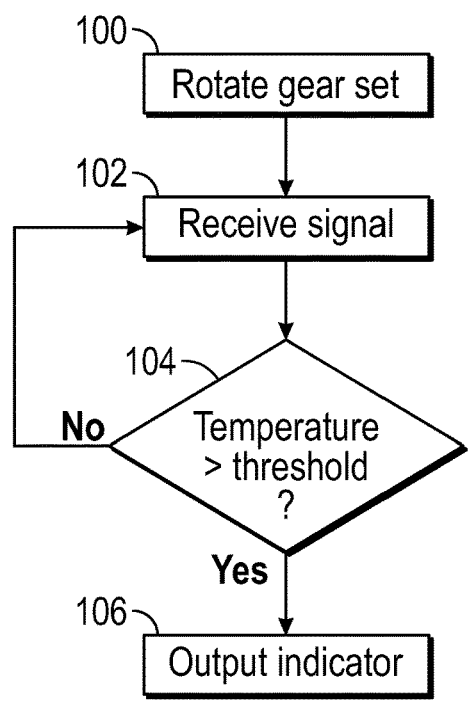
FIG. 4 is an illustrative method of monitoring a temperature of a gear set.

Referring to FIG. 4, an illustrative method of monitoring the health of a gear set 22 is shown. At block 100, the gear 24 of the gear set 22 may be rotated or actuated to move the output member 26 of the actuator 14 to move the movable component 12.

At block 102, the control system 30 receives a signal indicative of a temperature of the gear 24 of the gear set 22 from the temperature sensor 50. The signal may be transmitted wirelessly to the transmitter 52 of the temperature sensor assembly 40 and received by the receiver 90 of the control system 30. The control system 30 and the temperature sensor assembly 40 may continuously monitor the temperature or temperature rise of the gear 24, may intermittently monitor the temperature or temperature rise of the gear 24, or may monitor the temperature or temperature rise of the gear 24 responsive to rotation of the gear 24 or actuation of the actuator 14.

At block 104, the control system 30 may compare the temperature or temperature rise of the gear 24 to a threshold temperature or threshold or temperature rise. Should the temperature or temperature rise of the gear 24 be less than the threshold temperature or threshold temperature rise, the method may end or may return to block 102. If the temperature or temperature rise of the gear 24 is greater than the threshold temperature or threshold temperature rise, the method may continue to block 106.

At block 106, responsive to the temperature or temperature rise of the gear 24 being greater than a threshold temperature or threshold temperature rise, the control system 30 is configured to output for display an indicator. The indicator enables an operator of the drive system 10 to the possible efficiency drop due to heat and may enable the operator to take preventative measures or schedule downtime for maintenance or replacement of line replaceable units, e.g. the actuator 14 or gear set 22.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A drive system, comprising:
   a gear set arranged to move an aircraft control surface; and
   a health monitoring system in communication with the gear set, the health monitoring system, comprising:
   a temperature sensor disposed on a gear of the gear set and arranged to provide a signal indicative of at least one of a temperature and a temperature rise of the gear; and
   a control system arranged to receive the signal;
   wherein:
   the temperature sensor is provided with a transmitter, and wherein a permanent magnet generator powered diode is arranged to power the transmitter;
   the temperature sensor is part of a temperature sensor assembly disposed within a housing and wherein the gear set is positioned within the housing, and wherein the control system is in communication with the temperature sensor assembly, and the control system is configured to output for display an indicator responsive to at least one of the temperature and the temperature rise of the gear set being greater than a threshold:

an actuator includes the housing and the gear set disposed within the housing, and the gear set includes a gear that is drivably connected to the aircraft control surface, and wherein the actuator is a line replaceable unit (LRU) arranged to provide a rotary or linear output to the aircraft control surface or vary a position of the aircraft control surface.

2. The drive system of claim 1, wherein the control system is arranged to output for display an indicator, responsive to the signal indicating at least one of the temperature and the temperature rise of the gear being greater than a threshold.

3. The drive system of claim 1, wherein the temperature sensor is spaced apart from gear teeth of the gear.

4. The drive system of claim 1, wherein the temperature sensor is a thermocouple.

5. The drive system of claim 1, wherein the control system is provided with a receiver that is in communication with the transmitter.

6. A health monitoring system provided with an aircraft, comprising:
 a temperature sensor assembly disposed within a housing and positioned to monitor at least one of a temperature and a temperature rise of a gear of a gear set of an actuator that is positioned within the housing; and
 a control system in communication with the temperature sensor assembly,
 the control system being configured to output for display an indicator, and the temperature sensor is configured to provide a signal, responsive to at least one of the temperature and the temperature rise of the gear being greater than a threshold;
 wherein:
 the gear set is arranged to move an aircraft control surface;
 a control system is arranged to receive the signal;
 the temperature sensor is provided with a transmitter, and wherein a permanent magnet generator powered diode is arranged to power the transmitter;
 the temperature sensor is part of a temperature sensor assembly disposed within a housing and wherein the gear set is positioned within the housing, and wherein the control system is in communication with the temperature sensor assembly, and the control system is configured to output for display an indicator responsive to at least one of the temperature and the temperature rise of the gear set being greater than a threshold;
 the actuator includes the housing and the gear set disposed within the housing, and the gear set includes the gear that is drivably connected to the aircraft control surface, and
 wherein the actuator is a line replaceable unit (LRU) arranged to provide a rotary or linear output to the aircraft control surface or vary a position of the aircraft control surface.

7. The health monitoring system of claim 6, wherein the temperature sensor assembly includes a temperature sensor that is disposed on the gear.

8. The health monitoring system of claim 6, wherein the temperature sensor assembly includes a thermal camera that is mounted on the housing and faces towards the gear.

9. The health monitoring system of claim 6, wherein the temperature sensor assembly includes a temperature sensor disposed on the gear and a thermal camera mounted on the housing that faces towards the temperature sensor.

10. The health monitoring system of claim 6, wherein the temperature sensor assembly is in wireless communication with the control system.

11. A method of monitoring the health of a gear set, comprising:
 rotating a gear set to drive an actuator;
 receiving a signal indicative of at least one of a temperature and a temperature rise of a gear of the gear set from a temperature sensor disposed on the gear; and
 comparing at least one of the temperature and the temperature rise to at least one of a threshold temperature and a threshold temperature rise:
 wherein:
 the gear set is arranged to move an aircraft control surface;
 a control system is arranged to receive the signal;
 the temperature sensor is provided with a transmitter, and wherein a permanent magnet generator powered diode is arranged to power the transmitter;
 the temperature sensor is part of a temperature sensor assembly disposed within a housing and wherein the gear set is positioned within the housing, and wherein the control system is in communication with the temperature sensor assembly, and the control system is configured to output for display an indicator responsive to at least one of the temperature and the temperature rise of the gear set being greater than a threshold;
 the actuator includes the housing and the gear set disposed within the housing, and the gear set includes the gear that is drivably connected to the aircraft control surface, and
 wherein the actuator is a line replaceable unit (LRU) arranged to provide a rotary or linear output to the aircraft control surface or vary a position of the aircraft control surface.

12. The method of claim 11, further comprising:
 responsive to at least one of the temperature and the temperature rise being greater than at least one of the threshold temperature and the threshold temperature rise, outputting for display an indicator.

13. The method of claim 11, wherein rotating the gear set to drive the actuator moves the aircraft control surface.

* * * * *